(No Model.)
H. D. PERKY.
RECEIVING TROUGH AND CUTTER FOR CEREAL REDUCING MACHINES.
No. 532,286. Patented Jan. 8, 1895.
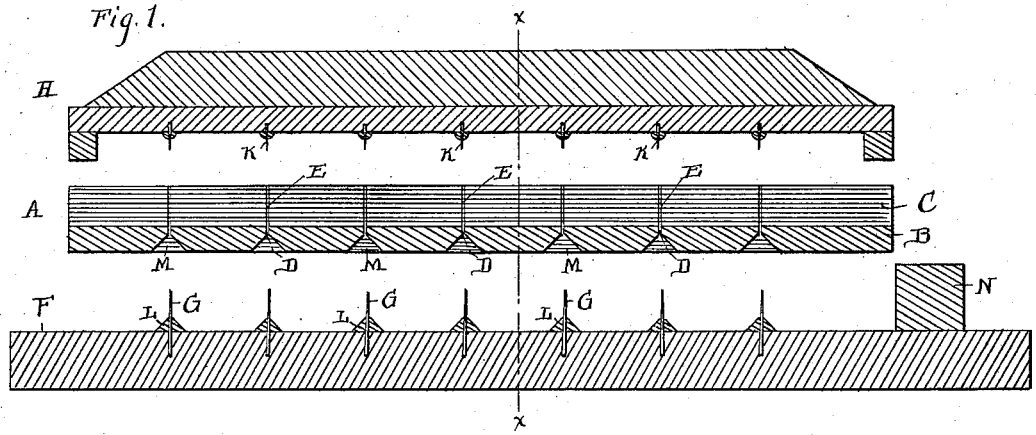
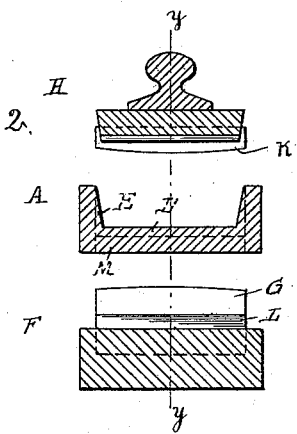
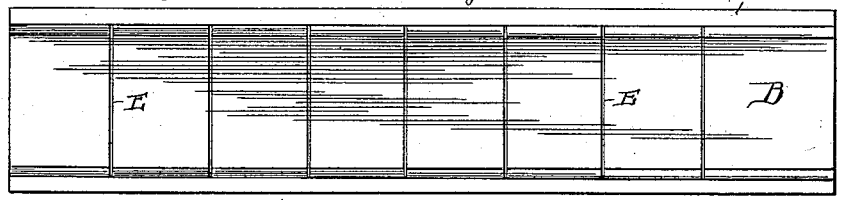
WITNESSES
Geo. M. Anderson
Phille Masi.
INVENTOR
Henry D. Perky
by E. W. Anderson
his Attorney

UNITED STATES PATENT OFFICE.

HENRY D. PERKY, OF DENVER, COLORADO, ASSIGNOR TO THE CEREAL MACHINE COMPANY, OF SAME PLACE.

RECEIVING-TROUGH AND CUTTER FOR CEREAL-REDUCING MACHINES.

SPECIFICATION forming part of Letters Patent No. 532,286, dated January 8, 1895.

Application filed March 31, 1894. Serial No. 505,947. (No model.)

*To all whom it may concern:*

Be it known that I, HENRY D. PERKY, a citizen of the United States, and a resident of Denver, in the county of Arapahoe and State of Colorado, have invented certain new and useful Improvements in Receiving-Troughs and Cutters for Cereal-Reducing Machines; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a longitudinal vertical section of the trough and the upper and lower cutters, the parts being separated from each other. Fig. 2 is a sectional view on the line $x$—$x$ Fig. 1. Fig. 3 is a plan view of the trough.

The object of this invention is to provide troughs or receivers for the reciprocating delivery slides of machines for preparing cereals for food, and in connection therewith means for dividing the product discharged upon the receivers into biscuit-form parts, adapted to be readily removed from said receivers for baking.

In the accompanying drawings, the trough or receiver A is represented in elongated form, having a bottom B, and side walls C, the latter having their inside faces a little inclined, usually, upward and outward to facilitate the removal of the contents of the receiver or trough. The ends of the trough are open.

The bottom B, is divided into portions, which are of the size of the biscuits desired, by narrow transverse slots D, which may extend in the form of grooves E vertically in the inside face portions of the side walls C. The slots D are usually widened below, to prevent clogging, and to guide the base cutter knives.

The trough or receiver is designed to be used in connection with the reciprocating slide of a food preparing machine to receive the shredded or thread-like product in layers. When the accumulation of layers is of sufficient thickness, the receiver is removed from the machine, and its place supplied by another of like character. The charged or full trough or receiver is then placed upon the base cutter F, and pressed down thereon so that the knives G enter the slots of the trough or receiver and divide the product therein into sections of the desired size for baking, this division however being to some extent incomplete, especially in the case of the product from wheat. To complete the division a top-cutter H may be employed, the knives K of which pass downward, guided by the side wall grooves of the trough A, and passing the cutting edges of the knives of the base cutter, exercise a shearing movement in connection therewith completely dividing the sections of the food product.

The base cutter F, is a gang cutter having a knife for each slot of the trough A. Its knives are braced, preferably by beveled base strips L, which, when the trough A is pressed down upon the base cutter, enter the wide lower portions or enlargements M of the slots D well up toward the surface of the trough bottom.

N represents a guide on the base cutter to facilitate the registering of the slots of the trough with the knives G. This guide may be arranged to also facilitate the entrance of the knives of the top gang cutter H into the side grooves of the trough.

Having described my invention, what I claim, and desire to secure by Letters Patent, is—

1. A transversely slotted open-end receiving trough having grooved side walls, substantially as specified.

2. The combination with a transversely slotted trough, of a gang base cutter, having a registration guide, substantially as specified.

3. The combination with a transversely slotted trough of a gang base cutter having upwardly extending knives, a registration guide, and a gang top cutter having downwardly extending knives, adapted to exert a shearing action in connection with the knives of the base cutter, substantially as specified.

In testimony whereof I affix my signature in presence of two witnesses.

HENRY D. PERKY.

Witnesses:
J. M. STANLEY,
HARRY C. JAMES.